Feb. 5, 1924.  
K. H. STOLSTEDT  
SAFETY HOOK  
Filed July 7, 1923
1,482,826
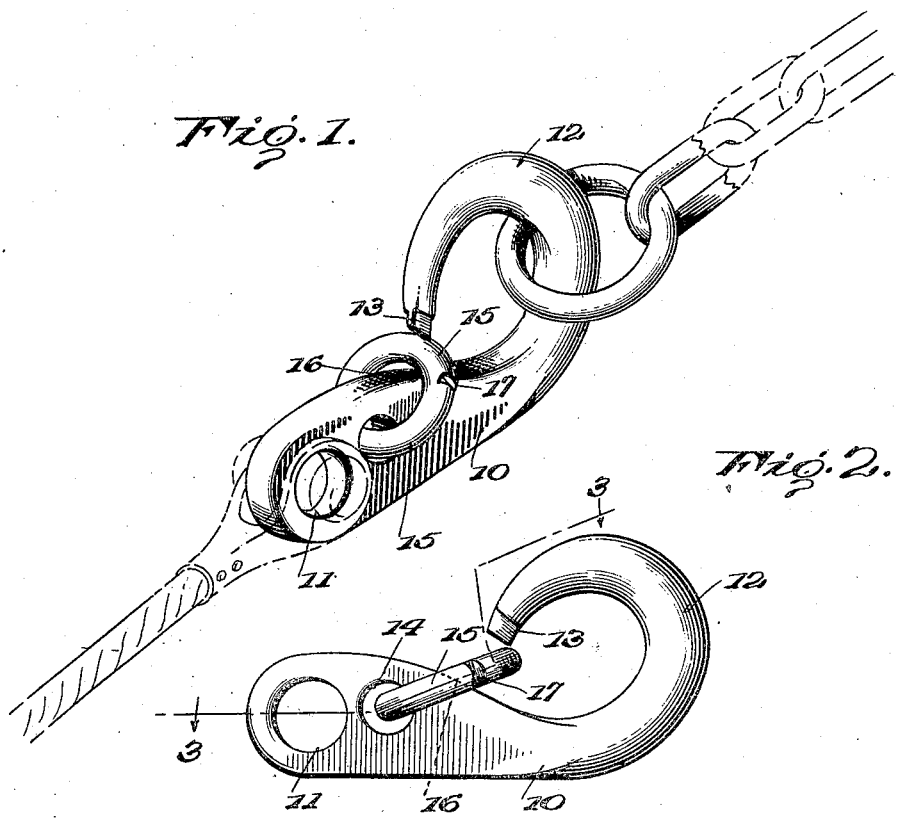
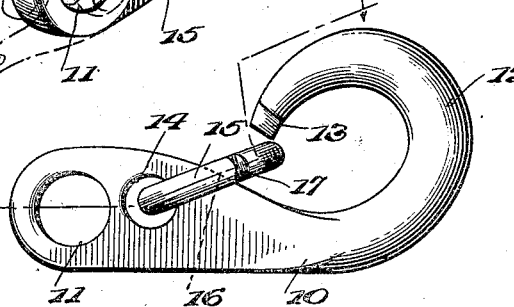
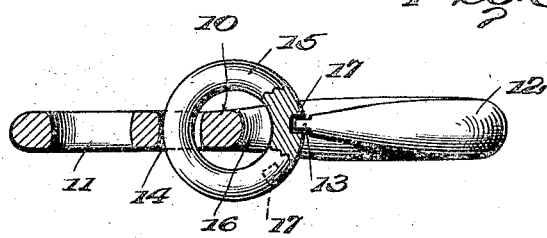
WITNESSES
INVENTOR  
K. H. Stolstedt.  
BY  
ATTORNEYS Patented Feb. 5, 1924.

1,482,826

UNITED STATES PATENT OFFICE.

KARL HJALMAR STOLSTEDT, OF CENTRALIA, WASHINGTON.

SAFETY HOOK.

Application filed July 7, 1923. Serial No. 650,158.

*To all whom it may concern:*

Be it known that I, KARL H. STOLSTEDT, a citizen of Finland, and a resident of Centralia, in the county of Lewis and State of Washington, have invented certain new and useful Improvements in Safety Hooks, of which the following is a specification.

This invention relates to a safety hook especially adapted for use in logging although of course being well adapted for other uses.

The object of the invention is to provide a safety hook of this character which is so constructed and organized that the line or element engaged within the hook is retained therein and is precluded from slipping around or by the extremity of the bill of the hook while at the same time the hook is susceptible of ready manipulation to permit of the removal of the line or element engaged with the hook at the will of the operator or the person handling the hook.

Another object is to provide a device of this character having the foregoing advantages and capacities and which is at the same time of simple and durable construction, reliable in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, illustrating the preferred embodiment of the invention;

Figure 2 is a view thereof in side elevation; and

Figure 3 is a view in section on line 3—3 of Figure 2.

Referring to the drawings wherein for the sake of illustration is shown the preferred embodiment of the invention, it will be seen that the safety hook includes a shank 10 one end of which is apertured, as at 11, or otherwise adapted for connection to a line, cable or the like, the opposite end of which has integrally formed therewith a bill or curved portion 12. The bill is extended back toward the shank 10 of the hook, as clearly shown in Figure 2 and its extremity is flattened, as indicated at 13. The shank 10 of the hook at a point adjacent but slightly spaced from the opening 11 is provided with a somewhat smaller opening 14 which as shown in Figure 2 is offset from the longitudinal axis of the shank in the direction of the extremity of the bill. A ring 15 of metal is mounted in the opening 14 so as to be capable of rotary adjustment. This ring may simply consist of a split ring constituted of metal of sufficient resiliency to enable it to be assembled with the shank 10 with its ends drawn closely together but preferably the ends of the split ring, after the ring is so associated with the shank, are welded so as to produce a substantially continuous structure. When assembled with the shank 10 a portion of the inner periphery of the ring rests on an inclined surface 16 formed on the shank 10 of the hook, the shank inclining or being cut away, as at 16, to provide for ample clearance or space within the bill of the hook, and yet enable the ring to be maintained in one of its positions to present a solid structure of metal in the space between the extremity 13 of the bill of the hook and the opposed portion of the shank. In this latter function of course the size of the ring 15 and the relation of the extremity 13 of the bill to the shank play a part. At one point in its outer periphery the ring 15 is formed with a transversely extending notch 17 which opens through the outer periphery of the ring. The notch enables the ring to pass by the extremity 13 of the bill when the ring is swung toward or away from the shank as under such conditions the extremity 13 passes through the notch 17. Of course it is to be understood that the ring 15 must first be adjusted angularly or rotated to bring its notch 17 into alinement with the extremity 13. When the ring 15 has been swung inwardly past the shank 10 it is then rotated so as to move the notch 17 away from and out of registry or alinement with the extremity 13 of the bill and at such time movement of the ring away from the shank is prevented since the ring engages the inner side or corner of the extremity of the bill. Moreover in such adjustment of the parts the ring presents a solid structure of metal effective to preclude the line, chain or element engaged with the bill from slipping around or passing its extremity. At the same time the line, chain or element engaged with the bill of the hook may be readily taken therefrom by simply rotating the ring 15 to bring its notch 17 into alinement or register with the extremity 13 of the bill of the hook, and then swinging the ring away from the surface 16 of the shank and into engagement with the upper or outer end of the shank at a point relatively remote from the extremity of the bill.

I claim:

1. A safety hook including a shank provided with an opening and a bill extended toward the shank, and a ring rotatably mounted in the opening of the shank, said ring being adapted to pass the bill in one angular adjustment thereof, said ring being engageable with the underside of the bill and the opposite portion of the shank to close the opening between the extremity of the bill and the shank and also being adapted to be swung up on the shank away from the bill to leave the opening between the extremity of the bill and the shank free and unobstructed.

2. A safety hook including a shank and a bill extended toward the shank and having its extremity flattened, said shank having an opening therein above the extremity of the bill and a ring rotatably mounted in the opening of the shank and having a notch in its outer periphery permitting the ring to pass by the flattened extremity of the bill and toward or away from the shank in one angular adjustment of the ring, the ring being adapted to be engaged with the under side of the bill, and with the opposite portion of the shank to present a positive structure to close the opening between the bill and the shank and also being adapted to be swung up on the shank away from the bill.

KARL HJALMAR STOLSTEDT.